US006879122B1

(12) United States Patent
Stewart et al.

(10) Patent No.: US 6,879,122 B1
(45) Date of Patent: Apr. 12, 2005

(54) GARAGE DOOR CONTROL SYSTEM AND METHOD OF OPERATION

(75) Inventors: James Patrick Stewart, San Diego, CA (US); Paul David Kahn, San Diego, CA (US)

(73) Assignee: Linear Corporation, Carlsbad, CA (US)

( * ) Notice: Subject to any disclaimer, the term of this patent is extended or adjusted under 35 U.S.C. 154(b) by 171 days.

(21) Appl. No.: 10/191,334

(22) Filed: Jul. 8, 2002

(51) Int. Cl.[7] .................................................. H02P 5/00

(52) U.S. Cl. ....................... 318/280; 318/286; 318/430; 318/466; 49/28; 49/26

(58) Field of Search ................................ 318/280–286, 318/430, 466, 486; 49/26, 28, 49

(56) References Cited

U.S. PATENT DOCUMENTS

| | | | | | |
|---|---|---|---|---|---|
| 4,010,408 | A | * | 3/1977 | Bailey | 318/266 |
| 4,234,833 | A | * | 11/1980 | Barrett | 318/282 |
| 4,274,227 | A | | 6/1981 | Toenjes | |
| 4,383,206 | A | * | 5/1983 | Matsuoka et al. | 318/445 |
| 4,638,433 | A | * | 1/1987 | Schindler | 700/90 |
| 5,218,282 | A | * | 6/1993 | Duhame | 318/603 |
| 5,240,349 | A | * | 8/1993 | Kennedy et al. | 405/132 |
| 5,291,686 | A | | 3/1994 | Sears et al. | |
| 5,625,980 | A | * | 5/1997 | Teich et al. | 49/26 |
| 6,086,177 | A | | 7/2000 | Driendl et al. | |
| 6,118,243 | A | * | 9/2000 | Reed et al. | 318/468 |
| 6,177,771 | B1 | * | 1/2001 | Kinzer et al. | 318/280 |

* cited by examiner

*Primary Examiner*—Rita Leykin
(74) *Attorney, Agent, or Firm*—Hogan & Hartson, LLP

(57) ABSTRACT

A method and apparatus for controlling the operation of a garage door opener is disclosed wherein a micro-controller de-energizes a garage door drive motor for a first period when a stop command is received while the garage door drive motor is energized and the garage door is travelling in a first direction. The micro-controller then energizes the drive motor to move the garage door in the opposite direction from the first direction for a second period. The micro-controller then de-energizes the drive motor, placing the door in a static state.

23 Claims, 5 Drawing Sheets

GARAGE DOOR CONTROL SYSTEM AND METHOD OF OPERATION

BACKGROUND

This invention relates generally to control systems, and more particularly to control systems for garage door openers and their method of operation.

Various types of automatic garage door openers have existed for many years. Conventional automatic garage door openers are electromechanical devices which raise and lower a garage door in response to actuating signals. The actuating signals are often electrical signals transmitted by actuation of a push-button switch through electrical wires or by radio frequency from a battery-operated, remote controller. In either case the electrical signals initiate movement of the garage door from the opposite condition in which it resides. That is, if the garage door is open, the actuating signal closes it. Alternatively, when the garage door is closed, the actuating signal will open the garage door.

In addition, typical garage door openers often include a halt cycle wherein the garage door drive motor is de-energized if an actuating signal is generated during opening or closing of the door. Conventionally a garage door may continue to travel or "coast" for some distance when the power is removed from the drive motor. This problem is particularly prevalent when a stop signal is received when the garage door is traveling in the downward direction where lower dynamic friction forces may not be sufficient to overcome the inertia of the moving garage door.

Prior attempts to remedy this problem have included adding friction to the garage door components to slow the coasting motion. However, the additional friction forces can be difficult to control and implement.

SUMMARY OF THE INVENTION

In one aspect of the present invention a garage door opener includes a movable carrier coupled to a garage door, a reversible drive motor coupled to the movable carrier for driving the movable carrier along a fixed track to raise and lower the garage door and a garage door control system coupled to the drive motor for controlling the operation of the drive motor. In an exemplary embodiment the garage door control system, in response to a stop command, de-energizes the drive motor for a first period and then energizes the drive motor for a second period to move the garage door in a direction opposite to the direction the door was traveling when the stop command was received to place the movable carrier in a static state.

In another aspect of the present invention a method for controlling the operation of a garage door opener includes de-energizing a garage door drive motor for a first period when a stop command is received while the garage door drive motor is energized, energizing the drive motor for a second period to move the garage door in a direction opposite to the direction the door was traveling when the stop command was received and then de-energizing the drive motor.

In a further aspect of the present invention a garage door opener includes a movable carrier coupled to a garage door, a reversible drive motor coupled to the movable carrier for driving the movable carrier along a fixed track to raise and lower the garage door and a garage door control system coupled to the drive motor. The exemplary garage door control system includes means for de-energizing the drive motor for a first period when a stop command is received while the drive motor is energized and reversing means for energizing the drive motor for a second period to move the garage door in a direction opposite to the direction the door was traveling when the stop command was received to place the garage door in a static state.

BRIEF DESCRIPTION OF THE DRAWINGS

These and other features, aspects, and advantages of the present invention will become better understood with regard to the following description, appended claims, and accompanying drawings, in which:

DETAILED DESCRIPTION OF THE INVENTION

An exemplary embodiment of the present invention provides a method and apparatus for raising and lowering a garage door. Generally there are two broad categories of garage doors in common use namely, one-piece doors and track guided multi-sectioned doors. In addition there are a number of different garage door openers that may be used to support and move both one piece garage doors and multi-sectioned garage doors. The present invention is not limited to a particular type of garage door opener. Rather the present invention may be integrated into any garage door control system having a software controlled processor or hardware equivalent thereof. However, the advantages of the present invention may be best understood in the context of an exemplary garage door opener.

Figure 1:
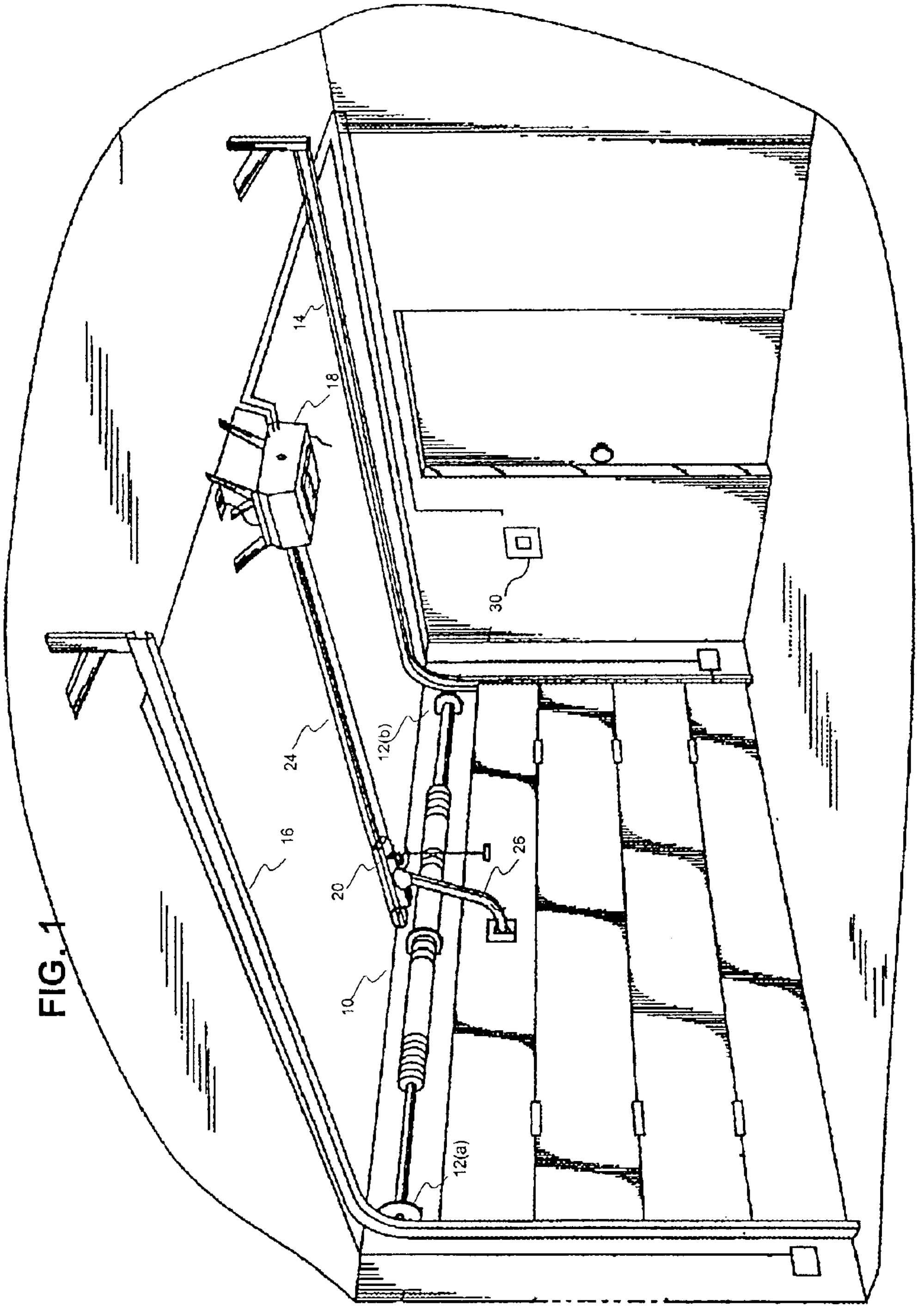
FIG. 1 is a perspective view of a garage door opener in a typical installation.

FIG. 1 is a perspective view of an installation of a garage door opener incorporating a garage door control system in accordance with an exemplary embodiment of the present invention. In the described exemplary embodiment the garage door 10 is an overhead multi-sectional type garage door that is supported for movement between open and closed positions by a set of rollers 12(*a*) and 12(*b*) which are movable in stationary tracks 14 and 16 at opposite sides of the door.

In an exemplary embodiment of the present invention an electric power actuator 18, which includes a reversible electric drive motor (not shown), is mounted above the door and connected thereto in a well known manner by a chain, belt or screw driven carrier 20 which is movable in a fixed track 24 and which is coupled to the door 10 by an arm 26. In accordance with an exemplary embodiment the door is movable between the open and closed positions by selectively energizing the drive motor by means of a manually actuated local switch such as, for example, wall switch 30. Alternatively, the drive motor may be remotely activated by a transmitter (not shown) that, upon actuation, transmits coded radio frequency signals to a receiver 130 (FIG. 2) in the garage door control system.

Figure 2:
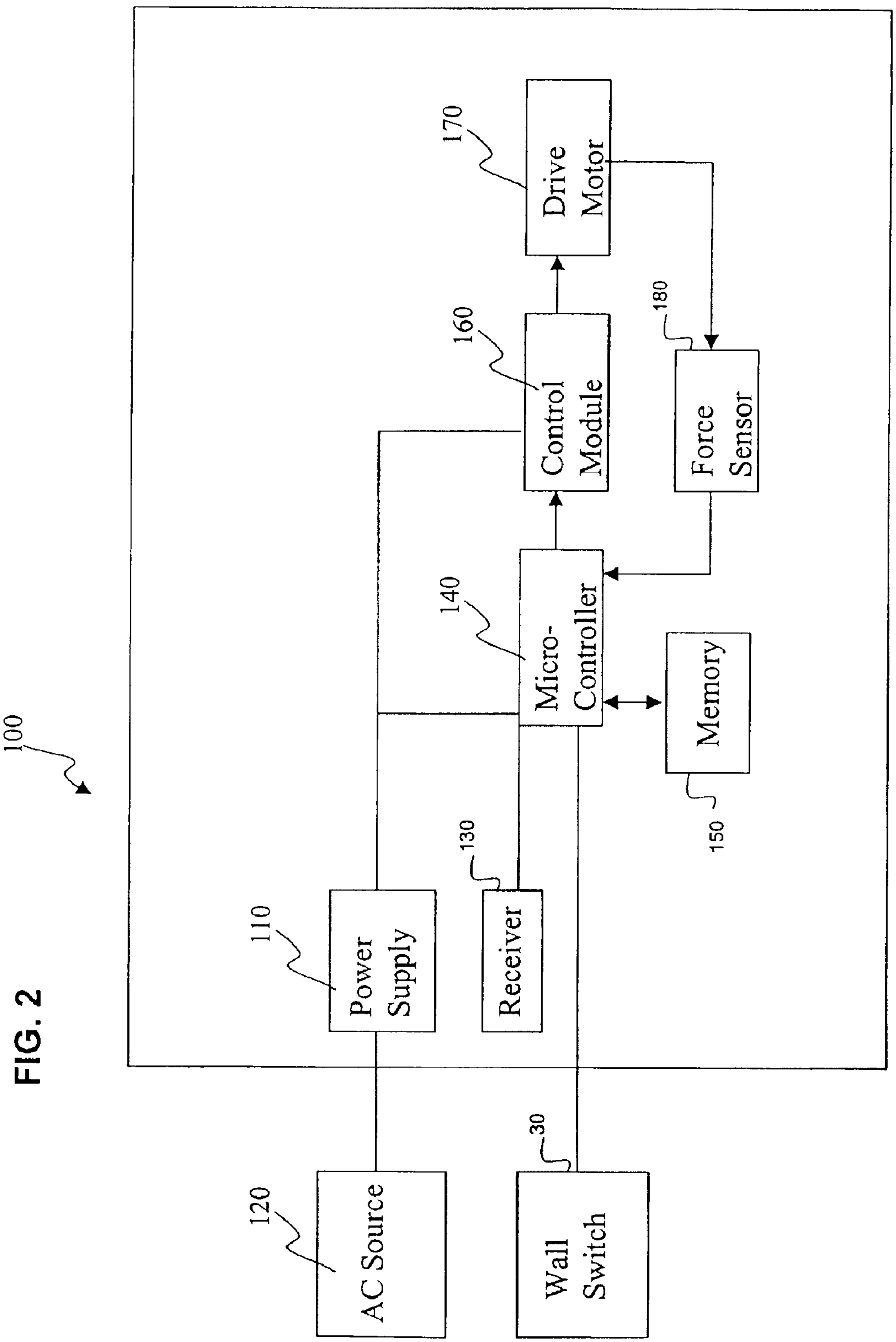
FIG. 2 is a simplified block diagram of a garage door control system in accordance with an exemplary embodiment of the present invention.

Referring to the simplified block diagram illustrated in FIG. 2, an exemplary garage door control system 100 preferably comprises a power supply 110 that receives alternating current from an alternating current source 120, such as, for example, a 110 volt AC current source, and converts the alternating current to required levels of DC voltage. In one embodiment the power supply 110 may include two or more separate DC power supplies as may be required to power the various components of the garage door control system 100.

An exemplary garage door control system further comprises a receiver 130 coupled to a micro-controller 140 or processor. A suitable micro-controller is available from Microchip Technology, Inc. located in Chandler, Ariz. or other commonly used devices. In the described exemplary embodiment the receiver 130 preferably receives coded radio frequency control signals from the remote transmitter and forwards either analog or digital signals to the micro-controller 140 indicating the receipt of a control signal. In an exemplary embodiment the micro-controller is preferably coupled to non-volatile memory 150 that may be used in addition to or in lieu of onboard ROM (not shown) on the micro-controller to store user codes, and other data related to the operation of the garage door control system.

In accordance with an exemplary embodiment, the wall switch 30 (FIG. 1) is preferably coupled via connecting wires to the micro-controller 140. The micro-controller 140, in response to the actuation of the wall switch or the remote transmitter, preferably forwards command signals to a control module 160. In an exemplary embodiment of the present invention the control module 160 comprises two or more directional relays, micro-switches or the like, for selectively energizing an AC or DC electric drive motor 170.

For example, in one embodiment the control module may be coupled to a coil (not shown) of the drive motor 170 to set the rotational direction of the drive motor (i.e. up/down or open/close). One of skill in the art will appreciate that a variety of garage door control systems are available for generally controlling the operation of a garage door opener. Therefore, the illustrated garage door control system is by way of example only and not by way of limitation.

During normal operation the garage door maintains a substantially constant speed when traveling from the open-to-close and from the close-to-open positions. However, if the garage door encounters an obstacle during travel, the speed of the door slows down or stops, depending upon the amount of negative force applied by the obstacle. In one embodiment the garage door control system may comprise a force sensor 180 that generates a force signal representative of the load applied to the garage door. The described exemplary micro-controller 140 receives the force signal for comparison to a predetermined threshold, and when the force signal exceeds the predetermined threshold, the micro-controller 140 de-energizes the drive motor 170 and may in one embodiment reverse the drive motor to move the door in the opposite direction it was traveling when the obstruction was encountered.

In one embodiment the force sensor may measure the speed of the drive shaft or rotating component of the drive motor the speed of which is proportional to the load applied to the door, i.e., the heavier the load, the slower the rotation of the motor drive shaft. For example, in one embodiment, the force sensor may comprise a tachometer coupled to the drive shaft of the drive motor that measures the rotation speed of the drive shaft. The tachometer may comprise pulse counters in the form of an optical encoder or magnetic flux sensor that count the revolutions of the drive motor drive shaft for a specified period of time and provide that count to the micro-controller. In the described exemplary embodiment the micro-controller may trigger an obstruction detection when the number of pulses counted falls below a threshold during the specified period of time.

The described exemplary garage door opener may further comprise an up limit switch (not shown) and a down limit switch (not shown) that sense when the garage door has reached a travel limit, for example when the garage door is fully open or fully closed. The limit switches are preferably coupled to the micro-controller 140. In operation the micro-controller forwards a command signal to the control module 160 to remove power or de-energize the drive motor in response to the actuation of the up and down limit switches.

In addition, in an exemplary embodiment the micro-controller 140 sets a limit switch flag in the non-volatile memory 150 in response to the actuation of either the up or down limit switch. The micro-controller preferably resets the up or down limit switch flag in response to movement of the garage door in the opposite direction of the flag, for example, downward when an up limit switch flag has been activated.

Further, when the garage door is in motion and a request to stop the door is received, either from the wall switch or a remote transmitter, the micro-controller may output a control signal to the control module to reverse the drive motor for a predetermined duration. The micro-controller may then issue a stop command to the control module to remove power from the drive motor. In an exemplary embodiment the duration of the reverse motion of the drive motor is sufficient to place the garage door in a static state. In the described exemplary embodiment the reverse motion of the garage door is preferably not visually obvious to a user.

Figure 3:
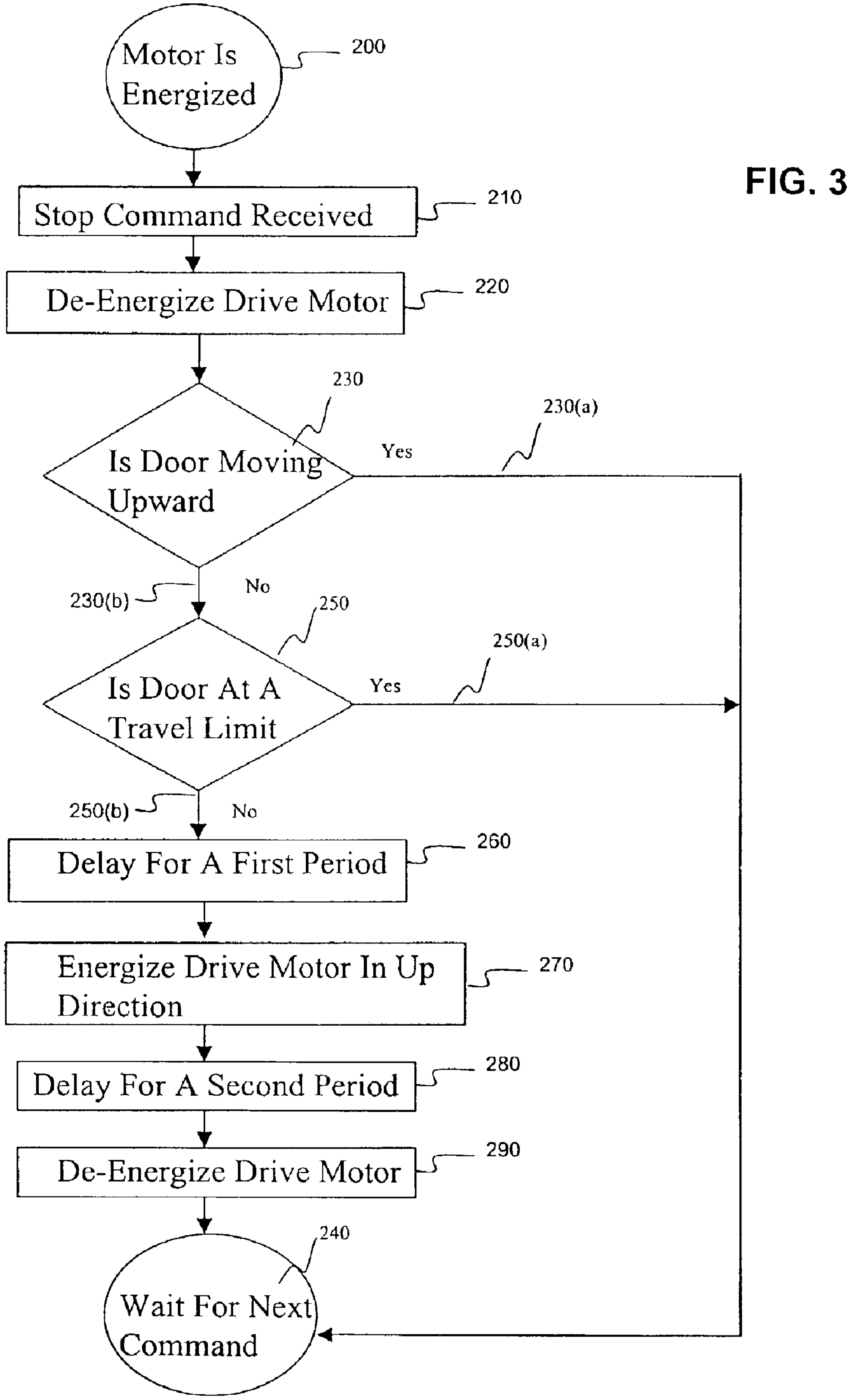
FIG. 3 is a graphical illustration of a process for stopping a garage door when a stop command is received when the garage door is in motion in accordance with an exemplary embodiment of the present invention.

FIG. 3 is a flow chart illustrating the operation of the described exemplary garage door control system in response to a stop command. In operation, when the drive motor is energized 200 and the door is in motion, a user may issue a stop control signal by actuating the wall switch or the remote transmitter which is received by the garage door control system and forwarded to the micro-controller 210. In an exemplary embodiment the micro-controller then issues a stop command that removes power from the drive motor 220. In the described exemplary embodiment the micro-controller determines whether the garage door was moving up when the stop command was received 230. If the garage door was moving up when the stop command was received 230(*a*) the micro-controller preferably waits for the next command 240 and allows the upward friction forces on the movable carrier to stop the door.

However, when the garage door is moving down when the stop command is received 230(*b*), the described exemplary micro-controller determines whether the garage door is at an upper or lower travel limit 250. If the garage door is at a travel limit 250(*a*), the micro-controller preferably waits for the next command 240. If the garage door is not at an upper or lower travel limit 250(*b*), the described exemplary micro-controller pauses for a first period 260, typically on the order of about 200 ms and then issues a command to energize the drive motor in the reverse direction to move the garage door upward 270. In an exemplary embodiment of the present invention the micro-controller preferably waits for a second period 280, preferably on the order of about 50 ms, and then issues a command to de-energize the drive motor 290.

One of skill in the art will appreciate that the time between micro-controller commands may vary in accordance with a variety of factors including for example, the size and weight of the door, the type of drive mechanism, i.e. belt, screw, chain etc. and the horsepower of the drive motor. For example, depending upon the application, the micro-controller may allow the door to coast in the downward direction for a period in the range of about 10 ms–1 sec before issuing a command to energize the drive motor in the reverse or upward direction. Similarly, depending upon the application, the micro-controller may energize the drive motor in the reverse or upward direction for approximately 10 ms –1 sec before de-energizing the drive motor to place the garage door in a stopped state.

Although an exemplary embodiment of the present invention has been described, it should not be construed to limit the scope of the present invention. Those skilled in the art will understand that various modifications may be made to the described embodiments. For example, an exemplary garage door control system may also be used to stop the garage door when the garage door is traveling in the upward direction when a stop command is received. In this instance, the described exemplary control system may de-energize the drive motor in response to the stop command, determine the direction of garage door travel and whether the garage door is at a travel limit. An exemplary garage control system may then again wait for a predetermined period and then energize the drive motor in the opposite direction that the door was traveling when the stop command was received. The described exemplary garage door control system may then de-energize the drive motor, placing the door in a static state.

Figure 4:
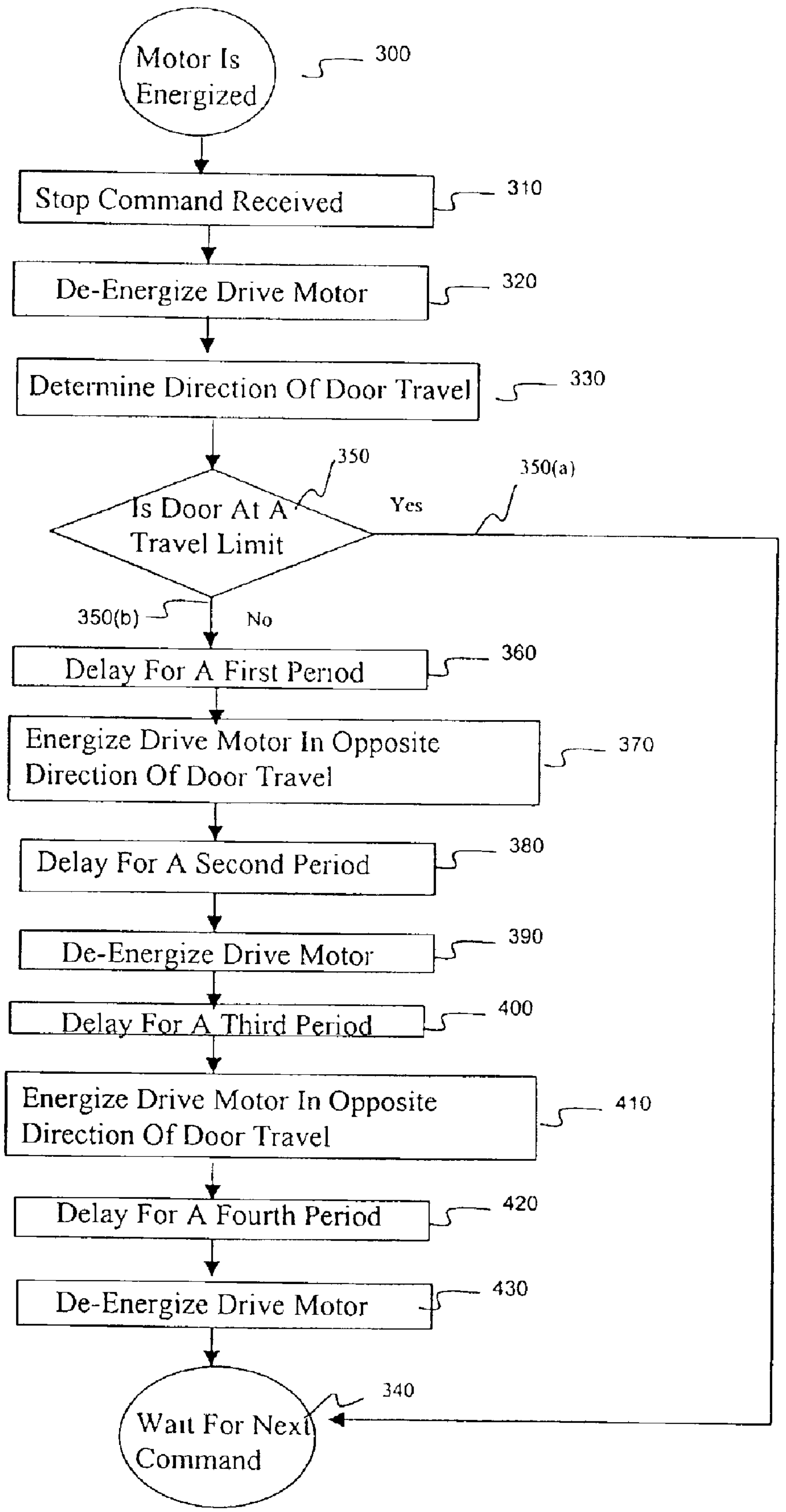
FIG. 4 is a graphical illustration of another process that utilizes a plurality of reversing cycles to stop a garage door when a stop command is received when the garage door is in motion in accordance with an exemplary embodiment of the present invention.

Similarly, an exemplary garage door control system may cycle through two or more coast/reversal cycles to stop the travel of a garage door in response to the receipt of a stop command. For example, referring to FIG. 4, when the drive motor is energized 300 and the door is in motion, a user may issue a stop control signal by actuating the wall switch or the remote transmitter which is received by the garage door control system and forwarded to the micro-controller 310. In an exemplary embodiment the micro-controller then issues a stop command that removes power from the drive motor 320. In the described exemplary embodiment the micro-controller determines the direction the garage door was traveling when the stop command was received 330.

The described exemplary micro-controller then determines whether the garage door is at an upper or lower travel limit 350. If the garage door is at a travel limit 350(*a*), the micro-controller preferably waits for the next command 340. If the garage door is not at an upper or lower travel limit 350(*b*), the described exemplary micro-controller pauses for a first period 360, typically in the range of about 10 ms–0.5 sec and then issues a command to energize the drive motor to move the garage door in the opposite direction it was traveling when the stop command was received 370. In an exemplary embodiment of the present invention the micro-controller preferably waits for a second period 380, typically in the range of about 10 ms–0.5 sec, and then issues a command to de-energize the drive motor 390.

In this embodiment, the micro-controller may pause for a third period 400, typically allowing the garage door to coast for approximately 10 ms–0.5 sec and then issues a command to energize the drive motor to move the garage door in the opposite direction it was traveling when the stop command was received 410. In an exemplary embodiment of the present invention the micro-controller preferably waits for a fourth period 420, typically in the range of about 10 ms–0.5 sec, and then issues a command to de-energize the drive motor 430 placing the door in a static state.

One of skill in the art will appreciate that the time between micro-controller commands may vary in accordance with a variety of factors including for example, the size and weight of the door and the horsepower of the drive motor. In addition, the number of cycles required to stop the garage door in response to the receipt of a stop command and the duration of those cycles (i.e. de-energize drive motor, delay, reverse drive motor, delay) may also vary in accordance with the application.

Figure 5:
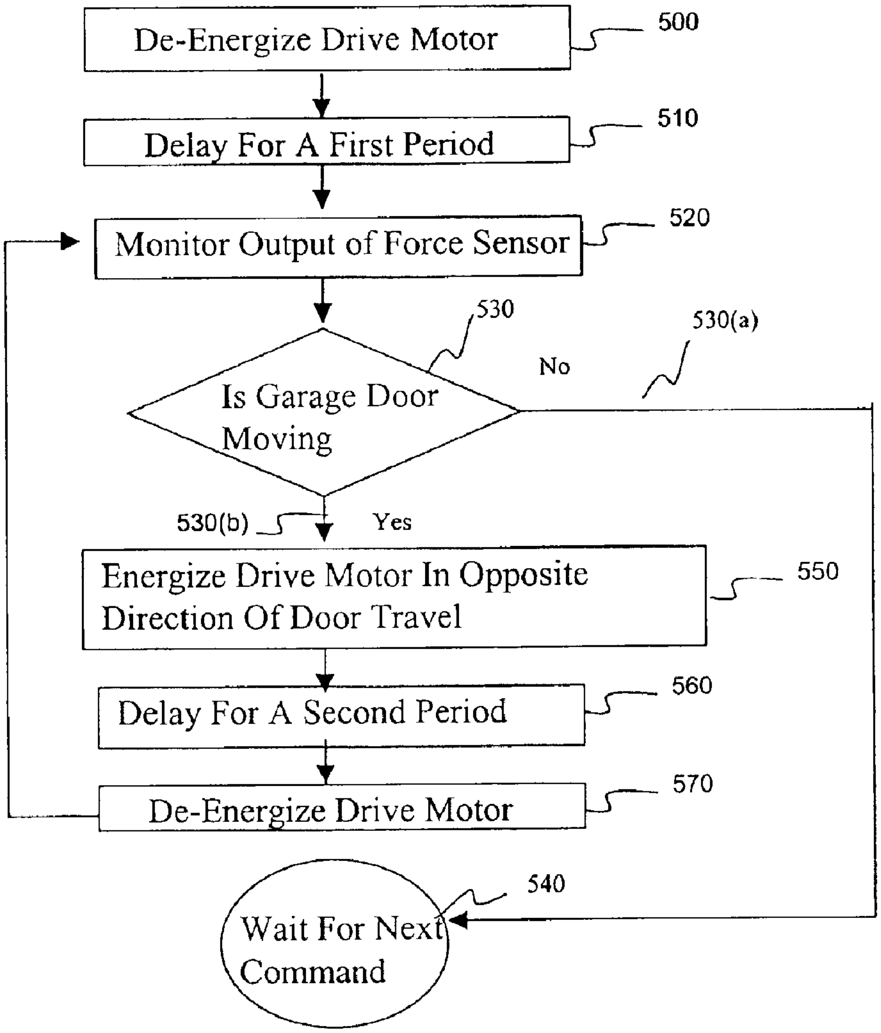
FIG. 5 is a graphical illustration of another process that determines whether a garage door is in motion when deciding to executing one or more reversing cycles to stop a garage door when a stop command is received when the garage door is in motion in accordance with an exemplary embodiment of the present invention.

In addition, in another embodiment, the micro-controller may monitor the status of the force sensor to determine if the garage door is moving after the receipt of a stop command when exercising a control loop to place the door in a static state. For example, in one embodiment the micro-controller may monitor the output of the force sensor to determine whether the drive motor should be reversed to stop a moving garage door when a stop command is received. FIG. 5 illustrates an alternative process for stopping a garage door, assuming a stop command is received when the drive motor is energized and traveling in a direction determined by the micro-controller and that the garage door is not at a travel limit. In this embodiment, the described exemplary garage door control system may again de-energize the drive motor 500 and delay for a first period 510, typically in the range of about 10 ms–0.5 sec. In this embodiment, the garage door control system may monitor the output of the force sensor 520 to determine whether the garage door is still in motion 530. If the garage door is not moving 530(*a*) the described exemplary garage door control system may wait for the next command 540.

However, if the garage door is still moving after the first period 530(*b*) the micro-controller may issue a command to energize the drive motor to move the garage door in the opposite direction it was traveling when the stop command was received 550. In an exemplary embodiment of the present invention the micro-controller may wait for a second period 560, typically in the range of about 10 ms–0.5 sec, and then issues a command to de-energize the drive motor 570. In this embodiment, the micro-controller may again monitor the status of the force sensor 520 to determine whether the garage door is still moving 530. If the garage door is still in motion the micro-controller may again energize the drive motor to move the garage door in the opposite direction that it was traveling when the stop command was received. In this embodiment the described exemplary micro-controller may continue to perform this control loop until the garage door is determined to be in a static state.

The invention described herein will itself suggest to those skilled in the various arts, alternative embodiments and solutions to other tasks and adaptations for other applications. It is the applicants' intention to cover by claims all such uses of the invention and those changes and modifications that could be made to the embodiments of the invention herein chosen for the purpose of disclosure without departing from the spirit and scope of the invention.

What is claimed is:

1. A garage door opener, comprising:

a movable carrier coupled to a garage door;

a reversible drive motor coupled to the movable carrier for driving the movable carrier along a fixed track to raise and lower the garage door;

a garage door control system coupled to the drive motor for controlling operation of the drive motor, wherein the garage door control system, in response to a stop command, de-energizes the drive motor for a first period and then energizes the drive motor to move said garage door in a direction opposite the direction the garage door was traveling when the stop command was received for a second period having only a duration that is needed to stop the garage door from coasting in its current direction of travel and to place the movable carrier in a static state between a fully raised and a fully lowered position.

2. The garage door opener of claim 1 wherein the garage door control system comprises a micro-controller coupled to the drive motor and wherein the micro-controller forwards command signals to the drive motor to control rotational direction of the drive motor.

3. The garage door opener of claim 2 wherein the garage door control system further comprises a control module coupled between the micro-controller and the drive motor, wherein the control module receives command signals from the micro-controller and forwards directional signals to the drive motor to control rotational direction of the drive motor.

4. The garage door opener of claim 2 wherein the garage door control system further comprises one or more limit switches coupled to the micro-controller that sense when the garage door has reached a travel limit, and wherein the second period is zero if the garage door has reached a travel limit when the stop command is received.

5. The garage door opener of claim 2 wherein the garage door control system further comprises a receiver that receives remote control signals from a remote transmitter and forwards received control signals to the micro-controller.

6. The garage door opener of claim 2 wherein the garage door control system further comprises a force sensor that forwards a force signal representing a speed of garage door motion to said micro-controller and wherein said micro-controller forwards command signals to the drive motor to control rotational direction of the drive motor in accordance with said force signal.

7. The garage door opener of claim 2 wherein the garage door control system further comprises non-volatile memory coupled to the micro-controller to store digital data related to operation of the garage door control system.

8. The garage door opener of claim 1 wherein the first period is in a range of about 10 ms–1 sec.

9. The garage door opener of claim 1 wherein the second period is in a range of about 10 ms–1 sec.

10. A method for controlling the operation of a garage door opener, comprising:

energizing a garage door drive motor to drive a garage door in a first direction;

receiving a stop command from a user while the garage door drive motor is energized;

de-energizing the garage door drive motor for a first period in response to the stop command;

after de-energizing the garage door drive motor for the first period and as a further response to the stop command, energizing the drive motor to move the garage door in a second direction opposite the first direction for a second period to place the garage door in a static state between a fully raised and a fully lowered position, wherein that required to stop coasting of the garage door in the first direction; and de-energizing the drive motor.

11. The method of claim 10 further comprising determining whether the garage door is at a travel limit when the stop command was received, wherein the drive motor is energized for said second period when the door is not at a travel limit.

12. The method of claim 10 further comprising determining whether the garage door is moving after energizing said drive motor for said second period.

13. The method of claim 12 further comprising energizing the drive motor to move the garage door in the second direction for a third period when the garage door is determined still to be moving after said second period.

14. The method of claim 10 further comprising energizing the drive motor to move the garage door in the second direction for a third period in response to the stop command and then de-energizing the drive motor.

15. The method of claim 10 wherein the first period is in a range of about 10 ms–1 sec.

16. The method of claim 10 wherein the second period is in a range of about 10 ms–1 sec.

17. A garage door opener, comprising:

a movable carrier coupled to a garage door;

a reversible drive motor coupled to the movable carrier for driving the movable carrier along a fixed track to raise and lower the garage door; and a garage door control system coupled to the drive motor, wherein the garage door control system comprises means for de-energizing the drive motor for a first period when a stop command is received while the drive motor is energized and reversing means for energizing the drive motor in a second direction opposite the direction the garage door was traveling when the stop command was received to place the garage door in a static state, wherein the drive motor is energized in the second duration for only a period needed to stop coasting of the garage door and does not result in a reverse motion of the garage door that is visually obvious to a user.

18. The garage door opener of claim 17 wherein the garage door control system further comprises a micro-controller coupled to the drive motor and wherein the micro-controller forwards command signals to the drive motor to control rotational direction of the drive motor.

19. The garage door opener of claim 18 wherein the garage door control system further comprises one or more limit switches coupled to the micro-controller that sense when the garage door has reached a travel limit.

20. The garage door opener of claim 19 wherein the second period is zero if the garage door has reached a travel limit when the stop command was received.

21. The garage door opener of claim 18 wherein the garage door control system further comprises a force sensor that forwards a force signal representing a speed of garage door motion to said micro-controller and wherein said micro-controller forwards command signals to the drive motor to control rotational direction of the drive motor in accordance with said force signal.

22. A method for preventing coasting of a garage door after receiving a stop command, comprising:

de-energizing a garage door drive motor for a first period in response to the stop command;

energizing the drive motor to move the garage door in a second direction opposite the garage door's current direction of travel for a second period of only a duration needed to stop coasting of the door and to place the door in a static state between a fully raised and a fully lowered position.

23. The method of claim 22 wherein movement of the garage door in the second direction is not visually obvious to a user.

* * * * *